United States Patent
Sinha et al.

(10) Patent No.: US 9,169,371 B2
(45) Date of Patent: Oct. 27, 2015

(54) COMPOSITIONS HAVING REDUCED FRICTIONAL COEFFICIENT, METHOD OF MANUFACTURE THEREOF AND ARTICLES COMPRISING THE SAME

(75) Inventors: Reema Sinha, Kolkata (IN); Sangita Nandi, Kolkata (IN); Susanta Mitra, Kolkata (IN); Radha Kamalakaran, Kolkata (IN); Edward Kung, West Chester, PA (US); Dwairath Dhar, Kolkata (IN); Gurram Kishan, Kolkata (IN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 654 days.

(21) Appl. No.: 13/162,259

(22) Filed: Jun. 16, 2011

(65) Prior Publication Data
US 2012/0322703 A1    Dec. 20, 2012

(51) Int. Cl.
| | |
|---|---|
| C07F 5/04 | (2006.01) |
| C10M 135/32 | (2006.01) |
| C08K 5/00 | (2006.01) |
| C08K 5/3445 | (2006.01) |

(52) U.S. Cl.
CPC .............. *C08K 5/0016* (2013.01); *C08K 5/3445* (2013.01)

(58) Field of Classification Search
CPC ..................... C10M 133/144; C10M 133/146
USPC ............................. 508/100, 269, 200; 524/206
See application file for complete search history.

(56) References Cited

U.S. PATENT DOCUMENTS

| | | | |
|---|---|---|---|
| 7,550,520 B2 | 6/2009 | Daly et al. | |
| 7,601,771 B2 | 10/2009 | Schmidt et al. | |
| 7,700,241 B2 | 4/2010 | Best et al. | |
| 2005/0288484 A1 | 12/2005 | Holbrey et al. | |
| 2006/0100323 A1* | 5/2006 | Schmidt et al. | ............... 524/106 |
| 2008/0114105 A1 | 5/2008 | Hell et al. | |
| 2009/0272946 A1 | 11/2009 | Lu | |
| 2010/0105586 A1 | 4/2010 | Bodesheim et al. | |

FOREIGN PATENT DOCUMENTS

| | | |
|---|---|---|
| EP | 1953211 A1 | 8/2008 |
| EP | 2468812 A1 | 6/2012 |
| WO | 2007077048 A1 | 7/2007 |
| WO | 2007077058 A1 | 7/2007 |
| WO | 2007143525 A1 | 12/2007 |
| WO | 2008154997 A1 | 12/2008 |
| WO | 2012084776 A1 | 6/2012 |

OTHER PUBLICATIONS

International Search Report dated Sep. 19, 2012 for International Application No. PCT/US2012/042037.
Written Opinion of the International Searching Authority mailed Sep. 19, 2012 for International Application No. PCT/US2012/042037.
(Continued)

*Primary Examiner* — James Goloboy
*Assistant Examiner* — Francis C Campanell
(74) *Attorney, Agent, or Firm* — Cantor Colburn LLP

(57) ABSTRACT

Disclosed herein is a composition comprising an organic polymer and about 2 to about 10 weight percent of an ionic liquid. The ionic liquid can be a halogenated or non-halogenated ionic liquid. Disclosed herein too are articles manufactured from the composition.

12 Claims, 2 Drawing Sheets

(56) References Cited

OTHER PUBLICATIONS

Qu, Jun, "Ionic Liquids as Novel Lubricants and Additives", Oak Ridge National Laboratory U.S. Department of Energy, pp. 1-23, UT-BATTELE, LLC, Sep. 2009.

Trulove, P.C., De Long, H.C., Stafford, G.R., Deki, S., Molten Salts XII Proceedings of the International Symposium, The Electrochemical Society, Inc., Proceedings vol. 99-41, The Electrochemical Society Inc., 65 South Main St., Pennington, MJ 08534-2839, USA.

Carrion, F.J., J. Sanes, M.D. Bermudez, "Effect of Ionic Liquid on the Structure and Tribological Properties of Polycarbonate—Zinc Oxide Nanodispersion", Science Direct.com, Materials Letters 61 (2007), pp. 4531-4535, Feb. 28, 2007, USA.

Yao, Meihuan, Fan, Mingjin, Liang, Yongmin, Zhou, Feng, Xia, Yanqiu, "Imidazolium Hexafluoraphosphate Ionic Liquids As High Temperature Lubricants for Steel-Steel Contacts", Elsevier.com Journal, Wear 268 (2010), pp. 67-71, Chinese Academy of Science, Lanzhou 730000, PR China.

Desplanques, O. Roussette, Degallaix, G., "An Investigation into Friction Behaviour of Dispersion-Strengthened Copper Under Sever Railway Braking Conditions", Tribology Letters, vol. 21, No. 2, Feb. 2006, France.

International Preliminary Report on Patentability for International Application No. PCT/2012/042037; International Filing Date Jun. 12, 2012; Mailed date Jan. 3, 2014. (7 pgs).

* cited by examiner

COMPOSITIONS HAVING REDUCED FRICTIONAL COEFFICIENT, METHOD OF MANUFACTURE THEREOF AND ARTICLES COMPRISING THE SAME

BACKGROUND

This disclosure relates to compositions having reduced frictional coefficients, methods of manufacture thereof and to articles comprising the same.

Organic polymers such as polyamides, polyesters, polycarbonates, and the like, are engineering thermoplastics and are frequently used in a variety of applications ranging from gears, cams, rollers, bearings, nuts and bolts, power tool housings, electrical connectors, combs, coil formers, fuel tanks for cars and kitchen utensils amongst other things. These engineering polymers frequently contact a metal counterface (i.e., a metal counterface that is opposed to a face of the engineering polymer) and over long periods of time under various conditions of mechanical stress, the surface of the polymer tends to develop wear cracks because of friction between the polymer and the metal counterface.

Several lubricants are used to counter this problem ranging from base oils (liquid lubricants) to a variety of solid lubricants including boron nitride, polytetrafluoroethylene (PTFE), graphite, and molybdenum disulfide. Many of these lubricants form a boundary film between the polymer surface and the metal counterface. However, frictional heat generated at the boundary causes degradation and evaporation of the lubricants.

For example, polyolefins and fluorinated ethylenes (e.g., polytetrafluoroethylene (PTFE)) are often used as lubricants in amounts of about 20 wt % in a polyamide (nylon 6) in order to improve the wear and frictional properties of the polyamide. The polytetrafluoroethylene forms a film between the polyamide and the metal counterface, thus reducing the coefficient of friction and thus the wear. The large amounts of polytetrafluoroethylene however, make the resulting polyamide very expensive. In addition, at very high temperatures the polytetrafluoroethylene also degrades to form volatile components that are environmentally hazardous.

It is therefore desirable to develop organic polymers and organic polymeric compositions that have low coefficients of friction that are inexpensive and that can use smaller amounts of an additive to reduce the coefficient of friction.

SUMMARY

Disclosed herein is a composition comprising an organic semicrystalline polymer; and about 2 to about 10 weight percent of an ionic liquid; the ionic liquid being a non-halogenated ionic liquid; wherein the composition displays a coefficient of friction at a PV value of 2,000 of about 0.05 to about 0.40 and a wear factor of 5 to about 30 when measured as per ASTM D 3702, using a thrust washer apparatus where the counter stationary surface in the test equipment is made of carbon steel having a Rockwell C hardness of 18 to 22 and a 12 to 16 micro-inch surface finish.

Disclosed herein too is a composition comprising an organic semicrystalline polymer; and about 2 to about 10 weight percent of an ionic liquid; the ionic liquid being a halogenated ionic liquid; wherein the composition has a coefficient of friction at a standard PV value of 10,000 of about 0.35 to about 0.80 and a wear factor of about 40 to about 300 when measured as per ASTM D 3702, using a thrust washer apparatus where the counter stationary surface in the test equipment is made of carbon steel having a Rockwell C hardness of 18 to 22 and a 12 to 16 micro-inch surface finish.

Disclosed herein too is a composition comprising an organic amorphous polymer; and about 2 to about 10 weight percent of an ionic liquid; the ionic liquid being a halogenated ionic liquid; wherein the composition has a coefficient of friction at a standard PV value of 2,000 of about 0.40 to about 0.50 and a wear factor of about 4,000 to about 13,000 when measured as per ASTM D 3702, using a thrust washer apparatus where the counter stationary surface in the test equipment is made of carbon steel having a Rockwell C hardness of 18 to 22 and a 12 to 16 micro-inch surface finish.

Disclosed herein too is a composition comprising an organic polymer; and about 2 to about 10 weight percent of an ionic liquid; the ionic liquid being 1-ethyl-3-methyl imidazolium chloride, 1-ethyl-3-methyl imidazolium ethyl sulfate or a combination thereof; wherein the composition displays a) a coefficient of friction at a PV value of 2,000 of about 0.05 to about 0.20 and a wear factor of about 5 to about 20 or b) a coefficient of friction at a PV value of 2,000 of about 0.7 to about 1.0 and a wear factor of about 150 to about 300 when measured as per ASTM D 3702, using a thrust washer apparatus where the counter stationary surface in the test equipment is made of carbon steel having a Rockwell C hardness of 18 to 22 and a 12 to 16 micro-inch surface finish.

Disclosed herein too is a composition comprising an organic polymer; and about 2 to about 10 weight percent of an ionic liquid; the ionic liquid being 1-ethyl-3-methyl imidazolium tosylate, 1-hexyl-3-methyl imidazolium hexafluorophosphate, tetraoctyl phosphonium bromide, hexadecyl tributyl phosphonium bromide, 1-ethyl-3-methyl imidazolium ethyl sulfate, or a combination thereof; wherein the composition has a coefficient of friction at a standard PV value of 10,000 of about 0.35 to about 0.80 when measured as per ASTM D 3702, using a thrust washer apparatus where the counter stationary surface in the test equipment is made of carbon steel having a Rockwell C hardness of 18 to 22 and a 12 to 16 micro-inch surface finish.

Articles manufactured from the composition are also described herein.

DETAILED DESCRIPTION

Figure 1:
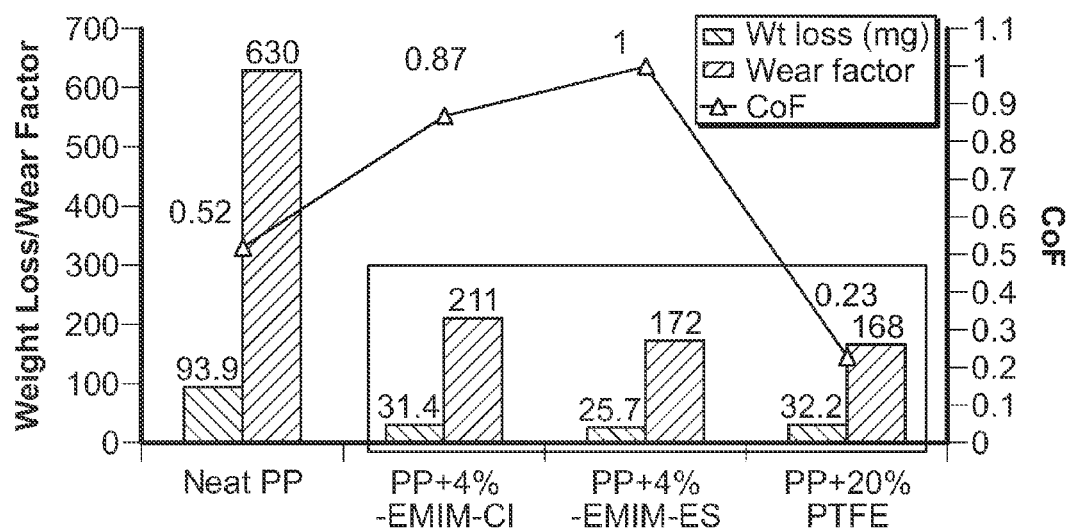
FIG. 1 is a bar graph that compares the weight loss, wear factor and the coefficient of friction for neat polypropylene, polypropylene containing 4 wt % EMIm-Cl, polypropylene containing 4 wt % EmIm-ES and polypropylene containing 20 wt % PTFE when tested at PV values of 2,000 (P=40 psi, V=50 fpm)

As used herein, the singular forms "a," "an," and "the" are intended to include the plural forms as well, unless the context clearly indicates otherwise. The endpoints of all ranges directed to the same component or property are inclusive of the endpoint and independently combinable, except when the modifier "between" is used. The modifier "about" used in connection with a quantity is inclusive of the stated value and has the meaning dictated by the context (e.g., includes the degree of error associated with measurement of the particular quantity). A "combination" is inclusive of blends, mixtures, alloys, reaction products, and the like.

In general, the compositions or methods can alternatively comprise, consist of, or consist essentially of, any appropriate components or steps disclosed. The invention can additionally, or alternatively, be formulated so as to be devoid, or substantially free, of any components, materials, ingredients, adjuvants, or species, or steps used in the prior art compositions or that are otherwise not necessary to the achievement of the function and/or objectives of the present claims.

Unless otherwise defined, all terms (including technical and scientific terms) used have the same meaning as commonly understood by one of ordinary skill in the art to which this invention belongs. Compounds are described using standard nomenclature. Any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

"Alkyl" means a straight or branched chain saturated aliphatic hydrocarbon having the specified number of carbon atoms. "Alkylene" means a straight or branched divalent aliphatic hydrocarbon group having the specified number of carbon atoms. "Aryl" means a cyclic moiety in which all ring members are carbon and a ring is aromatic. More than one ring can be present, and any additional rings can be independently aromatic, saturated or partially unsaturated, and can be fused, pendant, spirocyclic or a combination thereof. While stereochemistry of the various compounds is not explicitly shown, it is to be understood that this disclosure encompasses all isomers.

All cited patents, patent applications, and other references are incorporated by reference in their entirety.

All numerical ranges disclosed herein are inclusive of the endpoints. Further all values disclosed herein are interchangeable.

Disclosed herein are organic polymeric compositions having reduced frictional coefficients that comprise an organic polymer and an ionic liquid. The ionic liquid is generally added in small amounts of less than or equal to about 10 weight percent (wt %), based on the total weight of the organic polymeric compositions. These organic polymeric compositions can advantageously be used at high pressures, high rates of rotation and high temperatures and display reduced wear when compared with comparative compositions that do not contain the ionic liquid.

It has been discovered by the inventors hereof that ionic liquids that are liquid at room temperature (e.g., those having a melting point below room temperature) and having a high intrinsic viscosity (e.g., greater 250 cP at room) will be suitable for reducing friction when blended with polymeric compositions. Such polymeric compositions are especially useful at high PV (pressure*velocity) values ("PV values" are also sometimes referred to herein as "PV conditions") of 8,000 and above, but are not particularly suitable at standard PV values of 2,000 and below. The PV conditions relate to sliding wear tests conducted according to ASTM D 3702 and are described in greater detail below. At standard PV values, the temperature of the mating/contact surface between a thrust-washer (polymer sample) and a steel counterface is not very high and thus the viscosity of the ionic liquid also remains high. Without being limited to theory, as a result of the lower temperature at the interface, the ionic liquids plausibly are not able to form a uniform film at the mating surface thus resulting in less lubrication. At higher PV values, the temperature is high and as a result, the viscosity will drop to form uniform lubrication film at mating surface, resulting in good wear properties.

Ionic liquids that have low intrinsic viscosities (less than 100 cP at room temperature) do not work at high PV values, as at these values the ionic liquids will probably be expelled out of the mating surface, resulting in poor wear properties for the organic polymeric composition. At standard PV values, these types of ionic liquids work well in the organic polymeric compositions as the intrinsic viscosity is sufficiently high to form a uniform lubrication film at mating surface.

The ionic liquids that are solid at room temperature (e.g., have a melting point that is greater than room temperature) work well in the organic polymeric compositions at standard PV values. When the organic polymeric composition contains ionic liquids that are solid at room temperature, the ionic liquids will come to the surface of polymer matrix to form crystals. With this class of ionic liquids, viscosity does not play an important role at standard PV values since the ionic liquid will remain solid (due to low temperature at the mating surface) and provide lubrication. At high PV values, these ionic liquids will have sufficiently high viscosity to form a uniform lubrication film and provide good wear and frictional properties into an organic polymeric composition that they are blended into.

The organic polymer can be either a semicrystalline polymer or an amorphous polymer. Examples of suitable organic polymers are thermoplastic polymers, thermosetting polymers, blends of thermoplastic polymers, blends of thermosetting polymers, and blends of thermoplastic polymers with thermosetting polymers. The organic polymer can be a homopolymer, a copolymer, a block copolymer, an alternating copolymer, an alternating block copolymer, a random copolymer, a random block copolymer, a graft copolymer, a star block copolymer, a dendrimer, or a combination comprising at least one of the foregoing polymers. It is desirable for the organic polymer to be devoid of ionic species (i.e., to not be an ionomer).

Examples of thermoplastic polymers are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, styrene acrylonitrile, acrylonitrile-butadiene-styrene (ABS), polyethylene terephthalate, polybutylene terephthalate, polyurethane, ethylene propylene diene rubber (EPR), polytetrafluoroethylene, fluorinated ethylene propylene, perfluoroalkoxyethylene, polychlorotrifluoroethylene, polyvinylidene fluoride, polysiloxanes, or the like, or a combination comprising at least one of the foregoing organic polymers.

Examples of thermosetting polymers suitable for use in the polymeric composition include epoxy polymers, unsaturated polyester polymers, polyimide polymers, bismaleimide polymers, bismaleimide triazine polymers, cyanate ester polymers, vinyl polymers (e.g., styrenes), benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination comprising at least one of the foregoing thermosetting polymers.

Examples of blends of thermoplastic polymers include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleic-anhydride/acrylonitrile-butadiene-styrene, polyether etherketone/polyethersulfone, polyether etherketone/polyetherimide polyethylene/nylon, polyethylene/polyacetal, or the like.

In one embodiment, the organic polymers are semicrystalline polymers. Exemplary semicrystalline organic polymers are polyamides, polyolefins, polyether (ether) ketones, polyether sulfone, or the like, or a combination comprising at least one of the foregoing semicrystalline polymers. Exemplary polyamides are nylon 6; nylon 6, 6; nylon 4; nylon 4, 6; nylon 6, 12; nylon 10, 12; nylon 12, 12; nylon 11, nylon 12, or a combination comprising at least one of the foregoing polyamides. Exemplary polyolefins are polyethylene, polypropylene, polymethylpentene, polybutylene-1, or a combination comprising at least one of the foregoing polyolefins.

In another embodiment, the organic polymers are amorphous polymers i.e., they do not display any crystallinity. Examples of amorphous organic polymers are polyphenylene ether, polyimides, polyetherimides, polystyrene, polycarbonates, polyacrylates, or the like, or a combination comprising at least one of the foregoing amorphous polymers.

The organic polymer may be present in the organic polymeric composition in an amount of about 80 to about 99 wt %, specifically about 85 to about 98 wt %, and more specifically about 90 to about 96 wt %, based on the total weight of the organic polymeric composition. In one embodiment, the organic polymer may be present in an amount of about 80 to about 82 wt %, specifically about 82 to about 84 wt %, specifically about 84 to about 86 wt %, specifically about 86 to about 88 wt %, specifically about 88 to about 90 wt %, specifically about 90 to about 92 wt %, specifically about 92 to about 94 wt %, specifically about 94 to about 96 wt %, and more specifically about 96 to about 98 wt %, based on the organic polymeric composition.

An "ionic liquid" as used herein is a salt having a melting point less than or equal to about 100° C. at about 1 atmosphere of pressure. In one embodiment, it is desirable for the ionic liquid to have a higher degradation temperature than the processing temperature of the polymer. This allows the ionic liquid to survive the manufacturing process and to function as a lubricant when used in service.

The ionic liquid may be a halogenated ionic liquid or a non-halogenated ionic liquid. The ionic liquids comprise a cation that is ionically associated with an anion. The cations are generally relatively large compared to simpler organic or inorganic cations, and these cations contribute to the low melting point of the ionic liquids. In one embodiment, the cations are asymmetric, heterocyclic organic cations. Examples of the cations are pyridinium, imidazolium, alkylimidazolium, pyrrolidinium, alkyl-ammonium, $C_1$-$C_{32}$ tetraalkylammonium, alkyl-phosphonium, $C_1$-$C_{32}$ tetraalkylphosphonium, sulphonium, thiazolium, triazolium, oxazolium, pyrazolium, undecenium, guanidinium, and isoquinolinium cations.

The anions are generally smaller, and can be organic or inorganic, for example halide (chloride [Cl]⁻, bromide [Br]⁻, iodide [I]⁻, specifically chloride), phosphate, alkylated phosphate, halophosphate specifically hexafluorophosphate [PF6]⁻, tetrafluoroborate [BF4]⁻, nitrate [NO3]⁻, acetate [CH3CO2]⁻, trifluoroacetate [$CF_3CO_2$]⁻, [TFSI]⁻, [$AsF_6$]⁻, [$SbF_6$]⁻, [F(HF)$_2$]⁻, [BETI]⁻, methyl sulphate [$CH_3SO_3$]⁻, trifluoro [$CF_3SO_3$]⁻, [N(CN)$_2$]⁻, anionic boron clusters such as [$CB_{11}H_{12}$]⁻, chloroaluminates such as [$AlCl_4$]⁻ and [$AlCl_7$]⁻, alkylsulfate specifically ethyl sulfate, nitrate, sulfonate, alkylated borate specifically tetrafluoroborate, saccharinate, alkyl carboxylate and bis(perfluoroalkylsulfonyl)amide specifically bis(trifluoromethylsulfonyl)amide. The ionic liquid may also be a mixture of two or more of the aforementioned salts.

Exemplary ionic liquids are 1-ethyl-3-methyl imidazolium chloride, 1-butyl-3-methyl imidazolium chloride, tetradecyl trihexyl phosphonium hexafluorophosphate, 1-ethyl-3-methylimidazolium tetrafluoroborate, 1-ethyl-3-methyl-imidazolium sulfate, 1-hexyl-3-methyl-imidazolium-hexafluorophosphate, 1-ethyl-3-methyl-imidazolium bis(trifluoromethylsulfonyl)imides, hexadecyl tributyl phosphonium bromides, tetraoctyl phosphonium bromides, hexadecyl pyridinium bromides, tetraoctyl phosphonium bromide, hexadecyl tributyl phosphonium bromide, hexadecyl pyridinium bromide, 1-ethyl-3-methyl imidazolium ethyl sulfate (EMIm-Es) commercially available as BASIONICS LQ01, 1-ethyl-3-methyl imidazolium tosylate (EMIm-Tos), 1-hexyl-3-methyl imidazolium hexafluorophosphate (HmIm-HFP), tetraoctyl phosphonium bromide (TOP-Br), hexadecyl tributyl phosphonium bromide (HDTBP-Br) commercially available as CYPHOS IL 162, 1-hexadecyl pyridinium bromide (HDPy-Br), and 1-ethyl-3-methyl imidazolium bis(trifluoromethylsulfonyl)imide, or the like, or a combination comprising at least one of the foregoing liquids.

Characteristics of the ionic liquids that are disclosed herein will now be described with regard to pressure (P) and velocity (V) test conditions. The PV conditions relate to sliding wear tests conducted according to ASTM D 3702 (the "Thrustwasher" test) where the wear behavior of thermoplastic disc (with a wear ridge) called a thrustwasher is measured against a steel counterface (a mating surface). P indicates the pressure in pounds per square inch while V indicates the velocity in feet per minute. The tests were conducted using a Lewis LRI-1a tribometer supplied by Lewis Research Inc., USA. The applied pressure (P in pounds per square inch) and rotating speeds (V in feet per minute) were controlled to give different PV conditions. The sliding distance was maintained at 46 kilometers (km), thus rotation times (T in minutes) are different of different values of P and V.

TABLE 1

| PV conditions | P (pounds per square inch) | V(feet per minute) | T (minutes) |
|---|---|---|---|
| 2,000 | 40 | 50 | 3000 |
| 4,000 | 40 | 150 | 1000 |
| 6,000 | 120 | 50 | 3000 |
| 8,000 | 80 | 100 | 1498 |
| 10,000 | 100 | 100 | 1498 |

The ionic liquids that are incorporated into the organic polymer composition are in a liquid state at room temperature (i.e., those having a melting point lower than room temperature) and have a high intrinsic viscosity (greater than 250 cP at room temperature) when measured as per ASTM D445-11 using a glass capillary viscometer are suitable for reducing the coefficient of friction values at PV conditions of greater than or equal to about 5000, specifically greater than or equal to about 8,000, specifically greater than or equal to about 10,000. PV conditions may be classified as standard PV values or conditions and high PV values.

Standard PV values are from about 1,500 to 5,000, while high PV conditions are from values greater than 5,000 to about 10,000.

Ionic liquids having a melting point lower than room temperature and that have a high intrinsic viscosity of greater than 250 cP at room temperature are not be suitable for use at standard PV values of less than or equal to about 5,000. At PV values of less than or equal to about 5,000, the temperature of the mating/contact surface between the thrust-washer (polymer sample) and steel counterface is not very high and thus the viscosity of ionic liquid in the organic polymer composition remains high. As a result, the ionic liquids in the organic polymer composition plausibly do not form a uniform film at the mating surface especially when smaller amounts of the ionic liquid are used in the organic polymeric composition. At high PV values of greater than 5,000, the temperature is increased because of increased frictional contact between the thrustwasher and the metal counterface causing the viscosity of the ionic liquid to drop and to form a uniform lubrication film at the mating surface, resulting in good wear properties.

Ionic liquids having a viscosity of greater than or equal to about 250 cP, specifically greater than or equal to about 275 cP, and more specifically greater than or equal to about 300 cP at room temperature can effectively lower the coefficient of friction when used in an organic polymeric composition at a PV value of greater than or equal to about 5,000, specifically at a PV value of greater than or equal to about 8,000, and more specifically at a PV value of greater than or equal to about 10,000.

Ionic liquids having a low viscosity of less than or equal to about 100 cP at room temperature will not work at PV values of greater than 5,000, as at those PV condition the ionic liquids are most likely to be expelled out of the mating track, resulting in poor wear properties. But at standard PV values of 5,000 or less, these low viscosity ionic liquids function properly as the viscosity will be sufficient enough to form a uniform lubrication film at mating surface.

Thus low viscosity ionic liquids having a viscosity of less than or equal to about 100 cP, specifically less than or equal to about 75 cP, and more specifically less than or equal to about 50 cP are effective for reducing the coefficient of friction in organic polymeric compositions that are subjected to PV values of less than or equal to about 5,000, specifically less than or equal to about 2,000, and more specifically less than or equal to about 1,500.

Ionic liquids that are solid at room temperature (i.e., those having a melting point greater than or equal to room temperature) will work at PV values of less than or equal to about 5,000. When subjected to PV values of less than or equal to about 5,000, the ionic liquids will come to the surface of polymer matrix to form crystals. Within such classes of ionic liquids, viscosity does not play an important role at PV values of less than or equal to about 5,000 since the ionic liquid will remain as solid (due to low temperatures at the mating surface) and will provide lubrication to the mating surface. At PV conditions of greater than or equal to about 5,000 these ionic liquids will have a sufficiently high viscosity to form uniform lubrication film and as a result will impart reduced frictional properties to the organic polymeric composition.

The ionic liquids are generally used in the organic polymer composition in amounts of less than 10 wt %, based on the total weight of the organic polymer composition. When the organic polymer composition comprises a semicrystalline polymer, the ionic liquid is present in an amount of up to about 6 wt %, based on the total weight of the organic polymer composition. In one embodiment, when the organic polymer composition comprises a semicrystalline polymer, the ionic liquid is present in an amount of about 3 to about 6 wt %, based on the total weight of the organic polymer composition. The ionic liquid may be present in amounts of about 3 to about 4 wt %, about 4 to about 5 wt %, and about 5 to about 6 wt %, based on the total weight of the organic polymer composition.

When the organic polymer composition comprises an amorphous polymer, the ionic liquid is present in an amount of up to about 10 wt %, based on the total weight of the organic polymer composition. In one embodiment, when the organic polymer composition comprises a semicrystalline polymer, the ionic liquid is present in an amount of about 3 to about 10 wt %, based on the total weight of the organic polymer composition. The ionic liquid may be present in amounts of about 3 to about 4 wt %, about 4 to about 5 wt %, about 5 to about 6 wt %, about 6 to about 7 wt %, about 7 to about 8 wt %, about 8 to about 9 wt %, and about 9 to about 10 wt %, based on the total weight of the organic polymer composition.

In one embodiment, in one manner of manufacturing the organic polymer composition, the organic polymer along with the ionic liquid are blended together. An exemplary form of blending involves melt blending, which comprises melting the organic polymer and with the ionic liquid into the molten thermoplastic polymer. Pre-blending of the thermoplastic polymer and the ionic liquid can be conducted prior to the melt blending.

In an embodiment, the compositions can be prepared by pre-blending the thermoplastic polymer and the ionic liquid prior to being fed into a melt blending device, although such pre-blending cannot always be desired. The pre-blending can be carried out in a mixer such as, for example, a drum mixer, ribbon mixer, vertical spiral mixer, Muller mixer, sigma mixer, chaotic mixer, static mixer, and the like. Pre-blending is generally carried out at room temperature.

The melt blending can result in the formation of an intermediate product such as, for example, pellets or briquettes that can be subsequently manufactured into an article or it can result in the direct formation of articles via a molding process.

Melt blending of the composition involves the use of shear force, extensional force, compressive force, ultrasonic energy, electromagnetic energy, thermal energy or combinations comprising at least one of the foregoing forces or forms of energy, and is conducted in processing equipment wherein the aforementioned forces or forms of energy are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing.

Melt blending involving the aforementioned forces can be conducted in machines such as single or multiple screw extruders, Buss kneaders, Henschel mixers, helicones, Ross mixers, Banbury, roll mills, molding machines such as injection molding machines, vacuum forming machines, blow molding machines, or the like, or a combination comprising at least one of the foregoing machines.

The plasticized polymer can be molded into an article having a desired shape. Molding can be conducted by compression molding, injection molding, vacuum forming, extrusion, blow molding, or the like.

The organic polymer compositions can be advantageously used in frictional applications. In one embodiment, articles manufactured from the composition have a coefficient of friction at room temperature of about 0.05 to about 1.0, specifically about 0.08 to about 0.7 and more specifically about 0.09 to about 0.6, and more specifically about 0.1 to about 0.5 when measured as per ASTM D 3702, using a thrust washer apparatus where the counter stationary surface in the test equipment is made of carbon steel having a Rockwell C hardness of 18 to 22 and a 12 to 16 micro-inch surface finish.

In an exemplary embodiment, when the organic polymer composition comprises 1-ethyl-3-methyl imidazolium chloride or 1-ethyl-3-methyl imidazolium ethyl sulfate or a combination thereof, an article manufactured from the composition has a coefficient of friction at a standard PV value of 2,000 of about 0.05 to about 0.3, specifically about 0.08 to about 0.25 and more specifically about 0.09 to about 0.23, and more specifically about 0.10 to about 0.20 when measured as per ASTM D 3702, using a thrust washer apparatus where the counter stationary surface in the test equipment is made of carbon steel having a Rockwell C hardness of 18 to 22 and a 12 to 16 micro-inch surface finish.

In another exemplary embodiment, when the organic polymer composition comprises 1-ethyl-3-methyl imidazolium tosylate (EMIm-Tos), 1-hexyl-3-methyl imidazolium hexafluorophosphate (HmIm-HFP), tetraoctyl phosphonium bromide (TOP-Br), hexadecyl tributyl phosphonium bromide (HDTBP-Br), 1-ethyl-3-methyl imidazolium ethyl sulfate, or a combination thereof, an article manufactured from the composition has a coefficient of friction at a standard PV value of 10,000 of about 0.25 to about 0.80, specifically about 0.35 to about 0.77 and more specifically about 0.40 to about 0.75, and more specifically about 0.45 to about 0.70 when measured as per ASTM D 3702, using a thrust washer apparatus where the counter stationary surface in the test equipment is made of carbon steel having a Rockwell C hardness of 18 to 22 and a 12 to 16 micro-inch surface finish.

In another embodiment, when subjected to a frictional application at a pressure of about 2 pounds per square inch to about 400 pounds per square inch and a velocity of about 20 feet per minute to about 400 feet per minute, an article manufactured from the organic polymer composition has a coefficient of friction that is about 10% to about 70% lower, specifically about 20% to about 50% lower, and more specifically about 25% to about 40% lower than a coefficient of friction for an organic polymer composition comprising the same organic polymer but that contains 20 wt % of polytetrafluoroethylene instead of the ionic liquid; the coefficient of friction being measured in a thrust washer apparatus as per ASTM D-3702, where the counter stationary surface in the test equipment is made of carbon steel having a Rockwell C hardness of 18 to 22 and a 12 to 16 micro-inch surface finish.

In another embodiment, articles manufactured from the organic polymer composition that contains ionic liquids has a wear factor K of less than or equal to about 20, specifically less than or equal to about 15, and more specifically less than or equal to about 10 when measured at a PV value of 2,000 in a thrust washer apparatus as per ASTM D-3702, where the counter stationary surface in the test equipment is made of carbon steel having a Rockwell C hardness of 18 to 22 and a 12 to 16 micro-inch surface finish. In an exemplary embodiment, the wear factor can be about 5 to about 20 when tested at a PV value of 2,000 as per ASTM D-3702.

In an exemplary embodiment, articles manufactured from the organic polymer composition that comprises 1-ethyl-3-methyl imidazolium tosylate (EMIm-Tos), 1-hexyl-3-methyl imidazolium hexafluorophosphate (HmIm-HFP), tetraoctyl phosphonium bromide (TOP-Br), hexadecyl tributyl phosphonium bromide (HDTBP-Br), 1-ethyl-3-methyl imidazolium ethyl sulfate, or a combination thereof, have a wear factor K of less than or equal to about 300, specifically less than or equal to about 250, and more specifically less than or equal to about 200 when measured at a PV value of 10,000 in a thrust washer apparatus as per ASTM D-3702, where the counter stationary surface in the test equipment is made of carbon steel having a Rockwell C hardness of 18 to 22 and a 12 to 16 micro-inch surface finish. In an exemplary embodiment, the wear factor can be about 150 to about 300 when tested at a PV value of 10,000 as per ASTM D-3702.

In yet another embodiment, articles manufactured from the composition when subjected to a frictional application at a pressure of about 2 pounds per square inch to about 400 pounds per square inch and a velocity of about 20 feet per minute to about 400 feet per minute, have a wear factor K of less than or equal to about 300, specifically less than or equal to about 250, specifically less than or equal to about 200, and more specifically less than or equal to about 175 when measured in a thrust washer apparatus as per ASTM D 3702, where the counter stationary surface in the test equipment is comprises carbon steel having a Rockwell C hardness of 18 to 22 and a 12 to 16 micro-inch surface finish.

In one embodiment, an article manufactured from the organic polymer composition has an increased life cycle (while transferring an equivalent amount of torque or energy) when compared with an article manufactured from a composition that contains an equivalent weight percentage of polytetrafluoroethylene. The life cycle for the article comprising the organic polymer composition is increased by an amount of greater than or equal to about 5%, specifically greater than or equal to about 10%, and more specifically greater than or equal to about 20% than the life cycle of an article manufactured from a comparative composition that comprises the same organic polymer and polytetrafluoroethylene.

In one embodiment, an article manufactured from the organic polymer composition having a lower abrasion rate (weight loss) when compared with an article manufactured from a comparative composition that comprises the same organic polymer and a polymeric lubricant, can transmit a torque that is in an amount of about 5% to about 50% greater, specifically about 10% to about 40% greater, and more specifically about 15% to about 35% greater than the torque transferred by an article manufactured from the comparative composition.

In another embodiment, an article manufactured from the organic polymer composition has a lower abrasion rate (weight loss) when compared with an article manufactured from a comparative composition containing the same polymer and a polymeric lubricant, and can transmit a torque that is in an amount of about 5% to about 50% greater, specifically about 10% to about 40% greater, and more specifically about 15% to about 35% greater than the torque transferred by an article manufactured from a comparative composition that comprises the same organic polymer and a polymeric lubricant (e.g., a polyolefin, a polyfluorocarbon, a polysiloxane, or the like). The lubricant may be mixed with the organic polymer in or can be reacted with the organic polymer (e.g., copolymerized) in the non-crosslinked composition.

Improving the ability of an organic polymer to withstand higher pressures, velocities and/or temperatures can in turn permit the material to be used in more demanding applications, where other engineering thermoplastics cannot be used. It can be used to replace metals, permitting weight reduction and allowing for higher design freedom. Moreover, the ability to withstand higher pressures and/or velocities allows for miniaturization of parts, and therefore further weight reduction and design freedom.

In another embodiment, the crosslinked polymers display a gradient in abrasion resistance from the outer crosslinked surface to an inner crosslinked surface. The crosslinked polymers generally display a high abrasion resistance at the outer surface and a lower abrasion resistance at the lower surface. The organic polymer composition may be used in The following examples, which are meant to be exemplary, not limiting, illustrate compositions and methods of manufacturing of some of the various embodiments described herein.

EXAMPLES

Example 1

This example was conducted to demonstrate that certain ionic liquids can enhance frictional performance of an organic polymer and can perform as well or better than a polymeric lubricant in certain applications under certain conditions. A polyamide was treated with a polymeric lubricant—polytetrafluoroethylene (PTFE) or with different ionic liquids and each composition was then tested to determine the performance of each sample.

Milled polyamide (nylon 6, also sometimes referred to as "PA6") was obtained from DOMO Chemicals in Germany. PTFE (Zonyl) was obtained from DuPont. The ionic liquid tetradecyl trihexyl phosphonium hexafluorophosphate ("IL1") was purchased from Fluka. The 1-ethyl-3-methyl imidazolium chloride (IL2) and the 1-butyl-3-methyl imidazolium chloride (IL3) were purchased from Sigma Aldrich.

The respective compositions and their respective ingredients are shown in the Table 2 below.

of the ionic liquids in the thrustwasher was done by nuclear magnetic resonance (NMR) studies. The NMR analysis was done in a Bruker 300 MH2 Ultrashield NMR instrument using deuterated hexafluoroisopropanol (HFIP-D2) as solvent and deuterated chloroform ($CDCl_3$) as the NMR lock. Target and actual loadings of the imidazolium ionic liquids as estimated by NMR and are shown in the Table 3.

TABLE 3

| Sample | Component | Mol % | Repeat Unit wt. | Wt. | Actual wt. % | Target wt % |
|---|---|---|---|---|---|---|
| Sample #4 | PA6 | 96.90 | 113 | 10949.51 | 96.03 | 96.0 |
| | IL2 | 3.10 | 146 | 452.84 | 3.97 | 4.00 |
| Sample #5 | PA6 | 97.62 | 113 | 11030.73 | 96.38 | 96.00 |
| | IL3 | 2.38 | 174 | 414.62 | 3.62 | 4.00 |

From the Table 3, it may be seen that a certain portion of the ionic liquids (IL2 and IL3) are lost during processing.

The sliding wear tests were conducted according to ASTM D3702 (Thrustwasher test) where the wear behavior of the respective samples in the form of a thermoplastic disc (with a wear ridge) is measured against a steel counterface (mating surface). The tests were conducted using a Lewis LRI-1a tribometer supplied by Lewis Research Inc., USA. The applied pressure (P) and rotating speeds (V) were controlled to give different PV conditions. The sliding distance was maintained at 46 km, thus rotation times (T) are different. The PV conditions employed to study the tribo-characteristics of the PA6 (nylon 6) compositions are listed in Table 1 above.

All the samples were evaluated for weight loss, wear factor and coefficient of friction as compared to neat nylon 6 and the Sample #2, which contained nylon 6 and polytetrafluoroeth-

TABLE 2

| Sample No. | Nylon 6 (wt %) | PTFE (wt %) | Ionic Liquid #1 (wt %) | Ionic Liquid #2 (wt %) | Ionic Liquid #3 (wt %) |
|---|---|---|---|---|---|
| Sample #1* | 100 | | | | |
| Sample #2* | 80 | 20 | | | |
| Sample #3 | 96 | | Tetradecyl trihexyl phosphonium hexafluorophosphate (4 wt %) | | |
| Sample #4 | 96 | | | 1-ethyl-3-methyl imidazolium chloride (4 wt %) | |
| Sample #5 | 96 | | | | 1-butyl-3-methyl imidazolium chloride (4 wt %) |

*Sample #1 and #2 are comparative examples.

The compositions from Table 2 are melt blended in a 25 millimeter Werner and Pfleiderer Twin Screw extruder. The extruder had 6 zones set at temperatures of 200, 210, 220, 230, 250, and 250° C. respectively. The die temperature was 250° C. The screw speed was 300 revolutions per minute. The extrudate was cut into pellets.

The compounded pellets were pre-dried for 6 hours at about 90° C. and were then molded into the thrustwasher samples (1 inch diameter) using a 100-ton L&T DEMAG injection-molding machine. The estimation of actual loading ylene. Mechanistic analyses were done to understand the lubrication mechanism of the ionic liquids. The weight loss, wear factor (K-Factor) and average coefficient of friction (CoF) at standard pressure (P) and velocity (V) of nylon 6 based composites containing 20 wt % PTFE and 4 wt % each of IL1 IL2 and IL3 respectively, are summarized in the Table 4 below. The FIGS. 1(A) and (B) shows the change in wear and frictional behavior respectively, of all the compositions as a function of sliding time at 2,000 PV (Standard PV) condition.

TABLE 4

|  | Sample #1 | Sample #2 | Sample #3 | Sample #4 | Sample #5 |
|---|---|---|---|---|---|
| Wt. Loss (mg) | 22.6 | 3.6 | 13.1 | 3.3 | 21.6 |
| Wear factor |  | 18 | 71 | 18 | 117 |
| Coefficient of Friction (CoF) | 0.44 | 0.32 | 0.33 | 0.11 | 0.34 |

From the Table 4, it may be seen that the Sample #4 containing the 1-ethyl-3-methyl imidazolium chloride has a weight loss that is less than that for Sample #2, the sample containing the polytetrafluoroethylene. The coefficient of friction is better for the Sample #4 than it is for the Sample #2.

Table 4 shows that at values of PV=2,000, both the weight loss and wear factor for Sample #2 and Sample #4 compositions are low and are almost equal to one another. The coefficient of friction however, is lowest for the Sample #4. It is observed that 4 wt % of IL2 (in Sample #4) decreased the wear factor by 85% and the coefficient of friction by 75% as compared to neat PA6 (Sample #1). The Sample #5 (containing 4 wt % IL3) and the Sample #1 showed very high wear behavior whereas the Sample #3 showed moderate values which indicates that they are not suitable at PV values of 2,000.

These results show conclusively that some ionic liquids function very well as lubricants for reducing friction at PV values of about 2,000.

From the above example, it may be seen that polyamides that are blended with alkylimidazolium halides can be used in frictional applications at PV values of 2,000. The polyamides may be used in amounts of 94 to 98 wt %, specifically 95 to 97 wt %, while the alkylimidazolium halides may be used in amounts of about 2 to about 6 wt %, specifically about 3 to about 5 wt %, based on the total weight of the composition. The Sample #4 displays a wear factor of about 15 to about 20 and a coefficient of friction of about 0.09 to about 0.15.

The performances of the Sample #'s 1-5 were also evaluated at 6,000 PV. There were two different PV conditions as shown in the Table 5. In one set of conditions, P was set at 40 pounds per square inch (psi) and V was set at 150 feet per minute (fpm), while at the second set of conditions, P was set at 120 pounds per square inch (psi) and V was set at 50 feet per minute (fpm). The performances of the Sample #'s 1-5 at 6,000 PV is listed in Table 5.

TABLE 5

|  | Sample #1 | | Sample #2 | | Sample #3 | | Sample #4 | | Sample #5 | |
|---|---|---|---|---|---|---|---|---|---|---|
| P, V values | 40, 150 | 120, 50 | 40, 150 | 120, 50 | 40, 150 | 120, 50 | 40, 150 | 120, 50 | 40, 150 | 120, 50 |
| Wt Loss (mg) | 18.3 | 30.6 | 31.4 | 11 | NA | 14.3 | NA | 15.2 | NA | 37.6 |
| Wear factor | 98.4 | 54.8 | 158 | 18.5 | NA | 25.8 | NA | 27.4 | NA | 67.9 |
| CoF | 0.14 | 0.68 | 0.57 | 0.8 | NA | 0.7 | NA | 0.69 | NA | 0.82 |

Table 5 shows that at P=120 psi and V=50 fpm the Sample #2 (containing 20 wt % PTFE) showed very low wear properties. Both Sample #3 and Sample #4 (IL1 and IL2 containing compositions) also showed moderate and almost indistinguishable wear factors, whereas Sample #1 (neat nylon 6) and Sample #5 (IL3 containing composition) showed very high wear behavior. Coefficient of friction values, on the other hand, are quite high and almost similar (0.7-0.8) for all the compositions. For P=40 psi and V=150 fpm, the Sample #1 (neat nylon 6) performed best, whereas the Sample #2 (20% PTFE containing composition) showed a very high weight loss and wear factor.

When PV was chosen to be 6,000, all three ionic liquids could not perform at V=150 fpm and excessive slippage on the wear track was observed. The ionic liquid 1-butyl-3-methyl imidazolium chloride (IL3) did not perform well at any low PV conditions when added to nylon 6 due to considerable degradation at 200° C. The mechanism of degradation of this ionic liquid could be explained by thermo-oxidative degradation of the alkyl imidazolium moiety.

Example 2

In this example, Sample #2 (containing 20 wt % PTFE) and Sample #4 (containing 4 wt % IL2) from Example 1 were subjected to PV values of 8,000 and 10,000 respectively. For the PV value of 8,000, P=80 psi and V=100 fpm, while for the PV value of 10,000, P=100 psi and V=100 fpm.

The results are shown in the Table 6 below.

TABLE 6

|  | Sample # 2 | | Sample # 4 | |
|---|---|---|---|---|
| P, V values | 80, 100 | 100, 100 | 80, 100 | 100, 100 |
| Wt. Loss (mg) | 76.8 | 154.7 | 27.2 | NA |
| Wear factor | 194 | 312.5 | 73.7 | NA |
| CoF | 0.6 | 0.7 | 0.7 | NA |

Table 6 shows that at PV=8,000, both weight loss and wear factor for the Sample #4 (containing 4 wt % IL2) are very low and are at least 60% lower than those of the Sample #2 (containing 20 wt % PTFE). The coefficient of friction, on the other hand is marginally lower for the Sample #2 than for the Sample #4.

Sample #2 (containing 20 wt % PTFE) showed a very high weight loss and wear factor at PV=10,000. The Sample #4 however could not withstand the PV=10,000 since the composition charred because of high frictional heat generation.

From the results in the Examples 1 and 2, it may be seen that the Sample #4 containing 4 wt % of the IL2 performed well in its resistance to abrasion between PV=2,000 and PV=8,000. However, when subjected to PV=10,000, it did not perform as well.

Example 3

In this example, a variety of polymers were blended with ionic liquids and tested. The polymers included both crystalline and amorphous polymers. The crystalline polymers were polyamides (nylon 6, PA 6), polypropylene (PP) and poly ether ether ketone (PEEK). The amorphous polymers were polyetherimide (PEI) and polyphenylene ether (PPO) and polystyrene (PS).

The ionic liquid was maintained at 4 wt % for all tests described in this example. The ionic liquids were 1-ethyl-3-methyl imidazolium chloride (EMIm-Cl) commercially available as BASIONICS ST 80, 1-ethyl-3-methyl imidazolium ethyl sulfate (EMIm-Es) commercially available as BASIONICS LQ01, 1-ethyl-3-methyl imidazolium tosylate (EMIm-Tos), 1-hexyl-3-methyl imidazolium hexafluorophosphate (HmIm-HFP), tetraoctyl phosphonium bromide, hexadecyl tributyl phosphonium bromide commercially available as CYPHOS IL 162, 1-hexadecyl pyridinium bromide, and 1-ethyl-3-methyl imidazolium bis(trifluoromethylsulfoonylimide) (EMIm-TFSI) commercially available as BASIONICS HP 01.

The various compositions are detailed in the Table 7 below along with some of the results of the processing.

TABLE 7

| Composition | Processing results |
| --- | --- |
| PA 6 + 4 wt % EMIm-ES | Processable |
| PA 6 + 4 wt % EMIm-Tos | Processable |
| PA 6 + 4 wt % HMIm-HFP | Processable |
| PA 6 + 4 wt % HDTBP-Br | Processable |
| PA 6 + 4 wt % TOP-Br | Processable |
| PA 6 + 4 wt % HDPy-Br | Processable |
| PP + 4 wt % EMIm-Cl | Processable |
| PP + 4 wt % EMIm-ES | Processable |
| PPO-PS + 4 wt % EMIm-Cl | Processable |
| PEI + 4 wt % EMIm-TFSI | Processable |
| PEEK + 4 wt % EMIm-TFSI | Not Processable |

The compositions from Table 7 are melt blended in a 25 millimeter Werner and Pfleiderer Twin Screw extruder. The extrudate was cut into pellets. The compounded pellets were pre-dried for 6 hours at about 90° C. and were then molded into the thrustwasher samples (1 inch diameter) using a 100-ton L&T DEMAG injection-molding machine.

The specimens were tested in the same manner as detailed in the Example 1. The samples were tested at PV=2,000 (P=40 psi, V=50 fpm), 6,000 (P=120 psi, V=50 fpm), 8,000 (P=80 psi, V=100 fpm) and 10,000 (P=100 psi, V=100 fpm).

The results are shown some of the compositions containing polyamide are shown in the Table 8 below.

TABLE 8

| PV value | Weight loss (mg) | Wear Factor | CoF |
| --- | --- | --- | --- |
| Nylon 6 + EMIm-ES | | | |
| 2,000 | 1.1 | 5.9 | 0.19 |
| 6,000 | 18.3 | 33 | 1.01 |
| 8,000 | 112 | 302 | 0.78 |
| 10,000 | 201 | 433 | 0.55 |
| Nylon 6 + EMIm-Tos | | | |
| 2,000 | 20 | 109 | 0.62 |
| 6,000 | 5.8 | 10.3 | 0.93 |
| 8,000 | 46.3 | 125 | 0.76 |
| 10,000 | 15.6 | 249 | 0.69 |
| Nylon 6 + HMIm-HFP | | | |
| 2,000 | 11 | 59 | 0.86 |
| 6,000 | 14 | 25 | 0.79 |
| 8,000 | 6.1 | 16 | 0.73 |
| 10,000 | 72 | 154 | 0.6 |
| Nylon 6 + HDTBP-Br | | | |
| 2,000 | 22.9 | 124 | 0.46 |
| 6,000 | 8.2 | 15 | 0.96 |
| 8,000 | 39 | 105 | 0.76 |
| 10,000 | 76 | 164 | 0.64 |

TABLE 8-continued

| PV value | Weight loss (mg) | Wear Factor | CoF |
| --- | --- | --- | --- |
| Nylon 6 + TOP-Br | | | |
| 2,000 | 14.6 | 79 | 0.77 |
| 6,000 | 5.6 | 10 | 1.02 |
| 8,000 | 70.7 | 192 | 0.75 |
| 10,000 | 132 | 285 | 0.63 |
| Nylon 6 + HDPy-Br | | | |
| 2,000 | 16.3 | 88 | 0.52 |
| 6,000 | 7.6 | 14 | 1.03 |
| 8,000 | 10.5 | 28 | 0.73 |
| 10,000 | 374 | 804 | 0.66 |

From the Table 8 above, it may be seen that the EMIm-Es provides abrasion resistance at PV values of 2,000 to 10,000. When the results from Table 8 are compared with those in Tables 4 and 5 above, it may be seen that the sample containing nylon 6 and EMIm-Es provides wear properties similar to the compositions containing 20 wt % PTFE at PV values of about 2,000 to about 8,000.

From the Table 8 it may also be seen that the compositions containing nylon 6 and EMIm-Tos, HMIm-HFP, HDTBP-Br and TOP-Br may be used effectively at PV values of about 6,000 to about 10,000.

The performance of the compositions containing polypropylene are displayed in the FIG. 1. The FIG. 1 is a bar graph which compares the weight loss, wear factor and the coefficient of friction for neat polypropylene, polypropylene containing 4 wt % EMIm-Cl, polypropylene containing 4 wt % EmIm-ES and polypropylene containing 20 wt % PTFE. All tests were conducted at PV values of 2,000 (P=40 psi, V=50 fpm). From the Figure, it may be seen that the compositions containing the ionic liquid perform as well as the composition containing PTFE.

Figure 2:
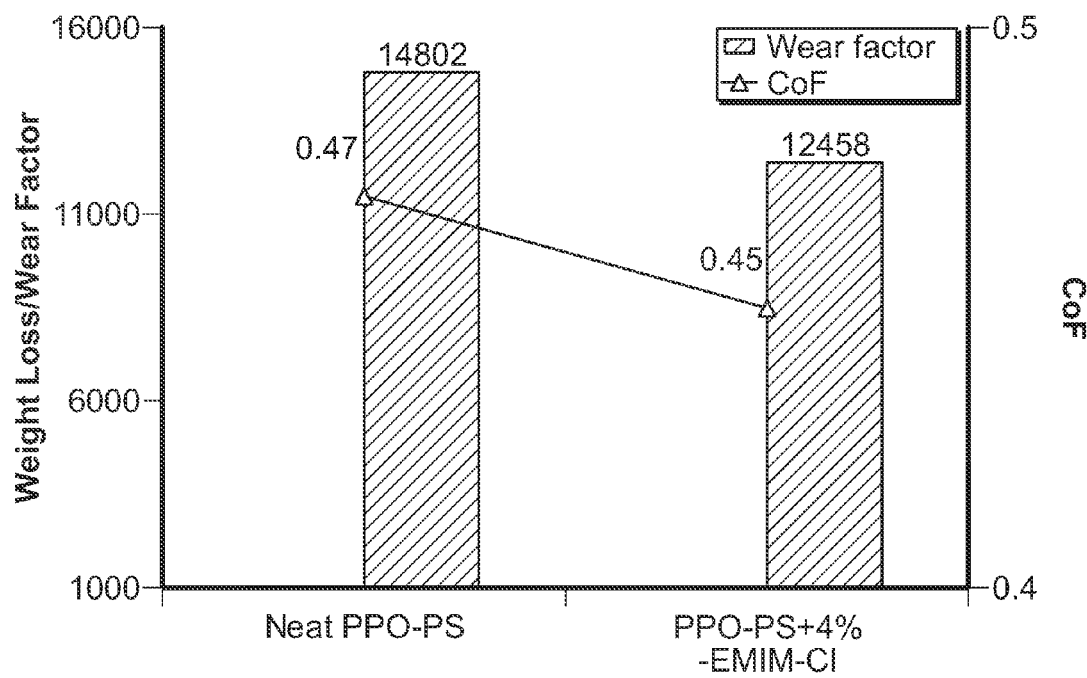
FIG. 2 is a bar graph that details the frictional performance of a neat PPO-PS blend and a composition that contains the blend with 4 wt % EMIm-Cl, when tested at a PV value of 2,000 (P=40 psi, V=50 fpm)

The performance for compositions containing the polyphenylene ether-polystyrene (PPO-PS) blend is shown in the FIG. 2. The PPO was blended with the PS in a 1:1 ratio by weight. The FIG. 2 is a bar graph that details the frictional performance of a neat PPO-PS blend and a composition that contains the blend with 4 wt % EMIm-Cl. The FIG. 2 shows that when tested at a PV value of 2,000 (P=40 psi, V=50 fpm), the sample containing the ionic liquid displays an improvement in its frictional properties when compared with the neat PPO-PS blend. From the FIG. 2, it may be seen that a composition comprising an organic amorphous polymer (PPO-PS) and about 2 to about 10 weight percent of a halogenated ionic liquid has a coefficient of friction at a standard PV value of 2,000 of about 0.35 to about 0.50 and a wear factor of about 11,000 to about 13,000 when measured as per ASTM D 3702 using a thrust washer apparatus where the counter stationary surface in the test equipment is made of carbon steel having a Rockwell C hardness of 18 to 22 and a 12 to 16 micro-inch surface finish.

Figure 3:
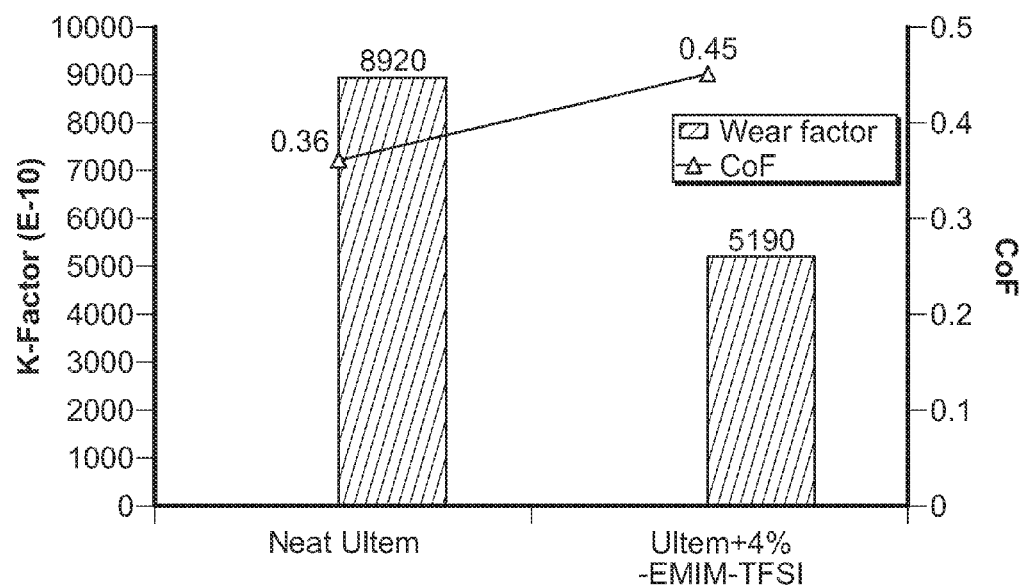
FIG. 3 is a bar graph showing wear factor and coefficient of friction results at PV values of 2,000 for a composition containing PEI.
Figure 4:
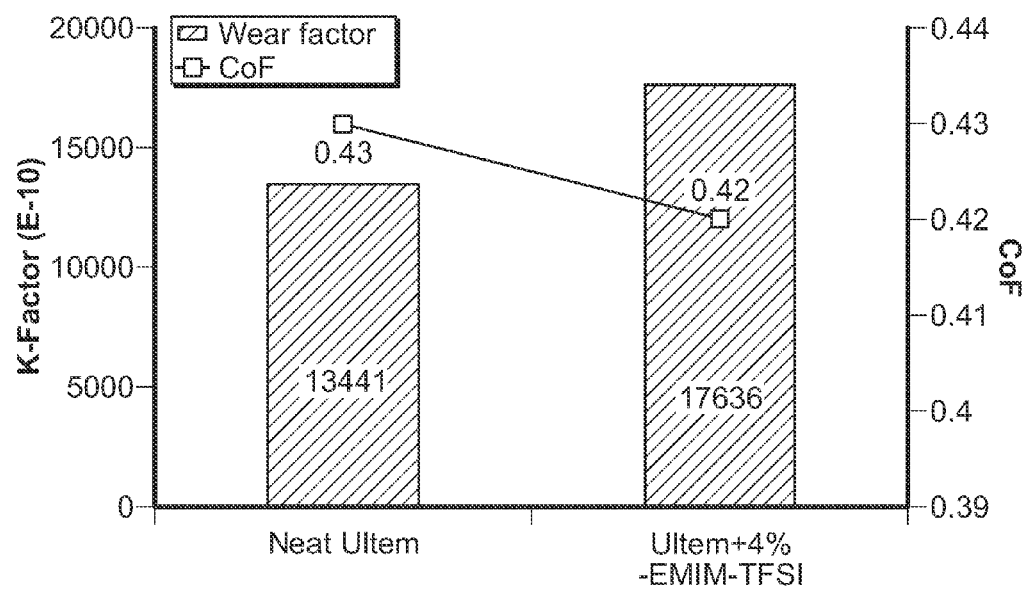
FIG. 4 is a bar graph showing wear factor and coefficient of friction results at PV values of 8,000 for a composition containing PEI.

The performance for compositions containing the polyetherimide (PEI) is shown in the FIGS. 3 and 4. The FIG. 3 shows wear factor and coefficient of friction results at PV values of 2,000, while the FIG. 4 shows wear factor and coefficient of friction results at PV values of 8,000. The FIGS. 3 and 4 are bar graphs that detail the frictional performance of neat PEI and a composition that contains the PEI with 4 wt % EMIm-TFSI. The FIG. 3 shows that when tested at a PV value of 2,000 (P=40 psi, V=50 fpm), the sample containing the ionic liquid displays an improvement in the wear factor properties when compared with the neat PEI. At a PV value of 2,000, the coefficient of friction increases when compared with the neat PEI. At a PV value of 8,000 (See FIG. 4), the wear factor increases due to increased weight loss, and the coefficient of friction decreases slightly.

From the FIG. 3, it may be seen that a composition comprising an organic amorphous polymer and about 2 to about 10 weight percent of a halogenated ionic liquid has a coefficient of friction at a standard PV value of 2,000 of about 0.35 to about 0.50 and a wear factor of about 4,000 to about 8,000, specifically about 5,000 to about 7,000 when measured as per ASTM D 3702 using a thrust washer apparatus where the counter stationary surface in the test equipment is made of carbon steel having a Rockwell C hardness of 18 to 22 and a 12 to 16 micro-inch surface finish.

From the FIG. 4, it may be seen that a composition comprising an organic amorphous polymer and about 2 to about 10 weight percent of a halogenated ionic liquid has a coefficient of friction at a standard PV value of 10,000 of about 0.40 to about 0.42 and a wear factor of about 15,000 to about 20,000, specifically about 16,000 to about 18,000 when measured as per ASTM D 3702 using a thrust washer apparatus where the counter stationary surface in the test equipment is made of carbon steel having a Rockwell C hardness of 18 to 22 and a 12 to 16 micro-inch surface finish.

From the foregoing experiments, it can also be seen that a composition comprising an organic amorphous polymer and about 2 to about 10 weight percent of an ionic liquid has a coefficient of friction of about 0.15 to about 0.50 at a standard PV value of 2,000 and a wear factor of about 35 to about 100 when measured as per ASTM D 3702, using a thrust washer apparatus where the counter stationary surface in the test equipment is made of carbon steel having a Rockwell C hardness of 18 to 22 and a 12 to 16 micro-inch surface finish.

From the results displayed above, it may be seen that the inclusion of an ionic liquid into either a crystalline or amorphous thermoplastic resin improves the frictional properties. Articles such as bushings, wear pads, bearings, and the like may be manufactured from the aforementioned compositions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising:
an organic semicrystalline polymer; and
about 2 to about 10 weight percent of an ionic liquid; the ionic liquid being 1-ethyl-3-methyl imidazolium chloride, 1-ethyl-3-methyl imidazolium ethyl sulfate or a combination thereof; wherein the composition displays a) a coefficient of friction at a PV value of 2,000 of about 0.05 to about 0.20 and a wear factor of about 5 to about 20 or b) a coefficient of friction of about 0.7 to about 1.0 at a PV value of 2,000 and a wear factor of about 150 to about 300 when measured as per ASTM D 3702, using a thrust washer apparatus where the counter stationary surface in the test equipment is made of carbon steel having a Rockwell C hardness of 18 to 22 and a 12 to 16 micro-inch surface finish.

2. The composition of claim 1, wherein the organic polymer is a polyamide, a polyolefin, or a combination comprising at least one of the foregoing organic polymers.

3. The composition of claim 1, wherein the organic polymer is a polyphenylene ether, a polyimide, a polyetherimide, a polystyrene, a polycarbonate, a polyacrylate, or a combination comprising at least one of the foregoing organic polymers.

4. The composition of claim 3, wherein the polyolefin is polypropylene.

5. The composition of claim 1, wherein the composition has a wear factor K of less than or equal to about 20.

6. A composition comprising:
an organic semicrystalline polymer; and
about 2 to about 10 weight percent of an ionic liquid; the ionic liquid being 1-ethyl-3-methyl imidazolium tosylate, 1-hexyl-3-methyl imidazolium hexafluorophosphate, tetraoctyl phosphonium bromide, hexadecyl tributyl phosphonium bromide, 1-ethyl-3-methyl imidazolium ethyl sulfate, or a combination thereof; wherein the composition has a coefficient of friction of about 0.35 to about 0.80 at a standard PV value of 10,000 when measured as per ASTM D 3702, using a thrust washer apparatus where the counter stationary surface in the test equipment is made of carbon steel having a Rockwell C hardness of 18 to 22 and a 12 to 16 micro-inch surface finish.

7. The composition of claim 6, wherein the organic polymer is a polyamide, a polyolefin, or a combination comprising at least one of the foregoing organic polymers.

8. The composition of claim 6, wherein the organic polymer is a polyphenylene ether, a polyimide, a polyetherimide, a polystyrene, a polycarbonate, a polyacrylate, or a combination comprising at least one of the foregoing organic polymers.

9. The composition of claim 7, wherein the polyolefin is polypropylene.

10. The composition of claim 6, wherein the composition has a wear factor K of about 150 to about 300.

11. An article manufactured from the composition of claim 1.

12. An article manufactured from the composition of claim 6.

* * * * *